United States Patent [19]

Sonobe et al.

[11] Patent Number: 4,597,018

[45] Date of Patent: Jun. 24, 1986

[54] IMAGEWISE INFORMATION PROCESSING METHOD AND APPARATUS

[75] Inventors: Hiraku Sonobe; Hiroshi Hara, both of Yokohama, Japan

[73] Assignee: Canon Kabushiki Kaisha, Tokyo, Japan

[21] Appl. No.: 530,751

[22] Filed: Sep. 9, 1983

[30] Foreign Application Priority Data

Sep. 14, 1982 [JP] Japan .................................. 57-160382
Sep. 14, 1982 [JP] Japan .................................. 57-160383

[51] Int. Cl.$^4$ .......................... H04N 1/21; H04N 1/23
[52] U.S. Cl. ..................................... 358/296; 358/300; 364/519
[58] Field of Search ....................... 346/108, 160, 154; 358/296, 300, 302

[56] References Cited

U.S. PATENT DOCUMENTS

| 4,084,195 | 4/1978 | Pereia | 358/296 |
| 4,155,103 | 5/1979 | Gamblin et al. | 358/296 |
| 4,315,684 | 2/1982 | Sugiura et al. | 355/14 |

Primary Examiner—E. A. Goldberg
Assistant Examiner—Patrick W. Foster
Attorney, Agent, or Firm—Fitzpatrick, Cella, Harper & Scinto

[57] ABSTRACT

This specification discloses an imagewise information processing method and apparatus in which imagewise information is stored in a memory, the imagewise information is read out and reproduction-processed and after the reproduction processing is all completed, the imagewise information stored in the memory can be automatically erased.

11 Claims, 19 Drawing Figures

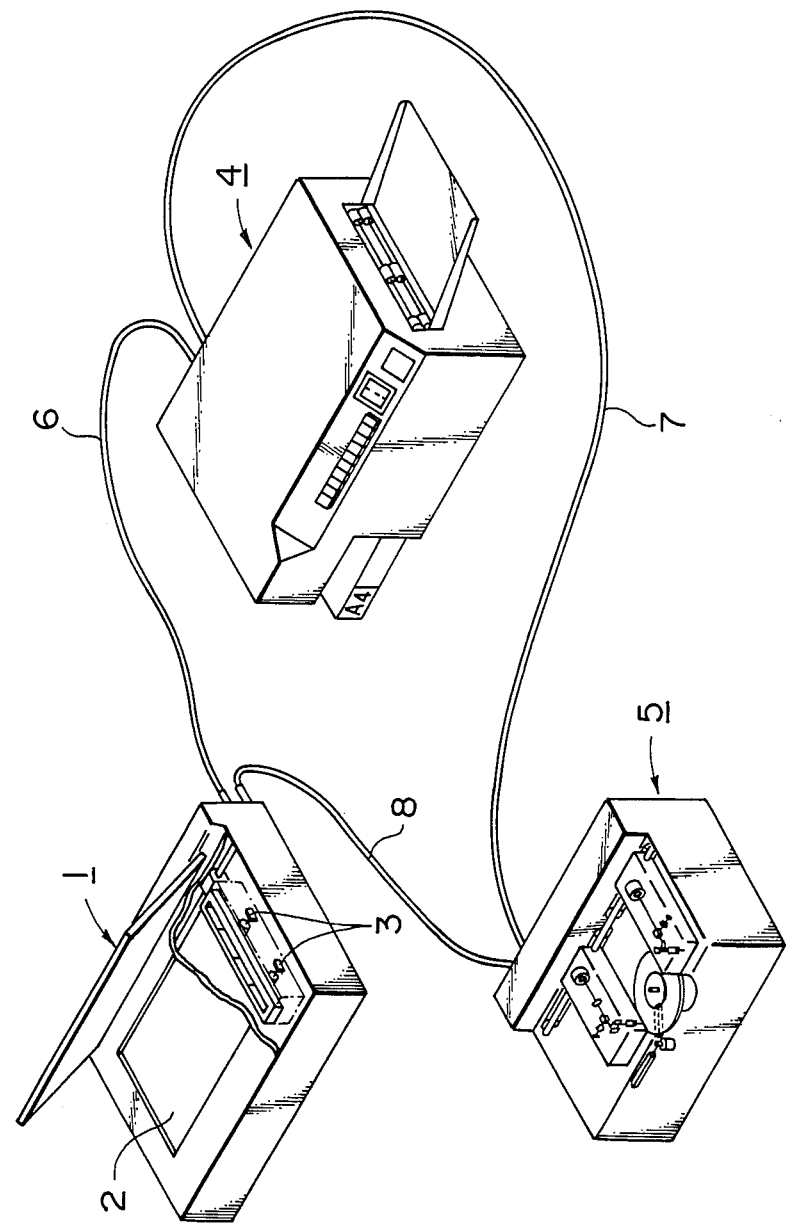
F I G. 1

IMAGEWISE INFORMATION PROCESSING METHOD AND APPARATUS

BACKGROUND OF THE INVENTION

1. Field of the Invention

This invention relates to an imagewise information processing method and apparatus, and more particularly to an imagewise information processing method and apparatus in which imagewise information is once stored in a memory and the imagewise information is read out from the memory in accordance with a processing instruction and reproduction-processed.

2. Description of the Prior Art

In copying apparatuses or the like, a sorter has heretofore been used as a collator for copies. For example, where it is desired to obtain plural copies of an original comprising a plurality of pages, the original-reading and image-output operation has been effected for each page the same number of times as the number of copies, and the resultant copies have been mechanically assorted by the sorter into trays having the same number of bins as the number of copies and have been piled in the order of pages. However, such a sorter is limited in the number of bins and therefore, is limited to the collation of the order of ten to fifty copies for the large size of the device, and this has led to the problem that the number of sheets contained per bin is limited to twenty to forty sheets.

An imagewise information processing method and apparatus which have solved the above-noted problem of the sorter are proposed in U.S. Pat. No. 4,315,684. This method comprises, for example, reading an original by making the imagewise information thereof into electrical signals by means of a CCD or the like, once storing the imagewise information in a memory, reading out the imagewise information from the memory in accordance with a processing instruction, and effecting the reproduction processing such as copying. When it is desired to obtain y copies of an original comprising x pages, the original is successively read, the imagewise information of the x pages (for example, $T_1, T_2, \ldots, T_{x-1}, T_x$) is stored in the memory, the information is read out in the desired order of pages y times (for example, such as $[T_1, T_2, \ldots, T_x]_1, [T_1, T_2, \ldots, T_x]_2, \ldots [T_1, T_2, \ldots, T_x]_y$) and y copies in the desired order of pages are obtained. According to this method, a great number of copies can be obtained within a short time by a compact apparatus.

The memory used in the above-described method is an erasable memory and has the function of erasing the stored information so that it may be repeatedly used during each imagewise information processing. The erasing of the imagewise information may be instructed within the time from after the reproduction processing has been terminated until new imagewise information is stored in the memory, but it is cumbersome to operate the memory each time. It is also undesirable from the viewpoint of keeping the information secret when the possibility of forgetting to erase the memory is taken into account.

SUMMARY OF THE INVENTION

It is an object of the present invention to provide an imagewise information processing method and apparatus in which the operation such as erasing or the like attendant on the imagewise information processing is simple.

It is another object of the present invention to provide an imagewise information processing method and apparatus which is excellent in security against leakage of secret information.

The present invention achieves these objects by an imagewise information processing method and apparatus in which imagewise information is stored in a memory and the imagewise information is read out from the memory and reproduction-processed and after the reproduction processing has all been terminated, the imagewise information stored in the memory can be automatically erased.

The invention will become more fully apparent from the following detailed description thereof taken in conjunction with the accompanying drawings.

BRIEF DESCRIPTION OF THE DRAWINGS

FIG. 1 is a perspective view showing an example of the construction of the information processing apparatus of the present invention.

DESCRIPTION OF THE PREFERRED EMBODIMENTS

Figure 2:
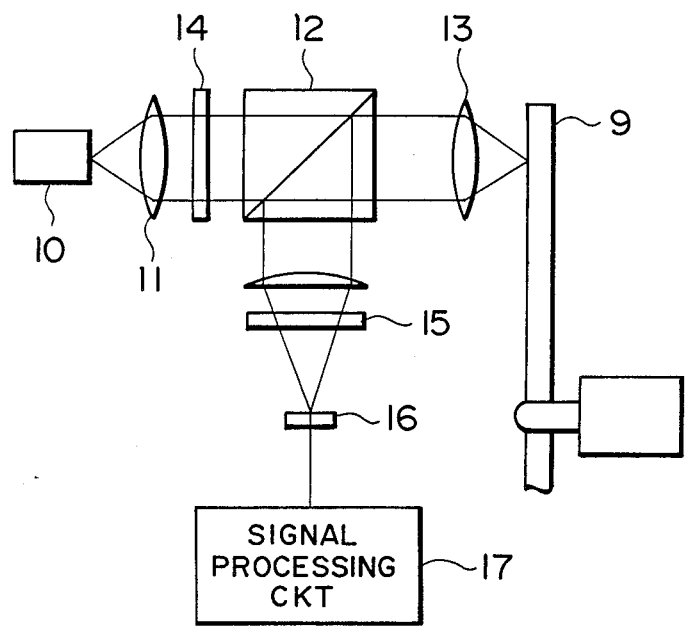
FIG. 2 is a schematic view illustrating the magneto-optical disk memory device of FIG. 1.

FIG. 1 is a perspective view showing an example of the construction of an imagewise information processing apparatus in accordance with the present invention. In FIG. 1, reference numeral 1 designates an original reading device in which an original is placed on an original supporting table 2, is optically scanned while being illuminated by a fluorescent lamp or the like and the imagewise information thereof is made into electrical signals by a solid state image pickup element (such as CCD) 3 and read. Designated by 4 is a printer. Where the printer 4 is, for example, a laser beam printer, the laser beam modulated on the basis of the imagewise information signals is imaged and scanned on a photosensitive medium and a copy image is obtained by a known electrophotographic process. Reference numeral 5 denotes a magneto-optical disk memory device which is capable of recording and reproducing input signals. The original reading device 1, the printer 4 and the magneto-optical disk memory device 5 are linked together by connecting means 6, 7, 8 such as coaxial cables or optical fibers and effect delivery of signals.

Figure 3:
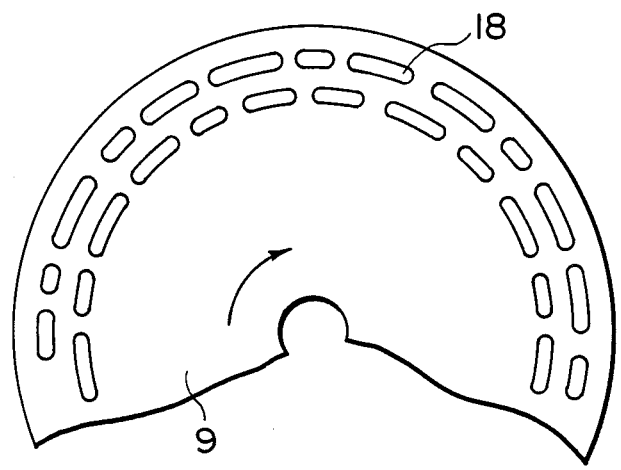
FIG. 3 is a schematic view illustrating the manner of recording of imagewise information on the magneto-optical disk.

The magneto-optical disk memory device 5 will hereinafter be described in more detail with reference to FIG. 2. In FIG. 2, a disk-like recording medium (hereinafter referred to as the disk) 9 comprises, for example, a glass disk on which a magnetic film consisting of compositions such as Gd, Tb and Fe have been vapor-deposited as by sputtering. During the recording, a light beam modulated on the basis of information emitted from a laser light source 10 is made into a parallel beam by a collimater lens 11 and condensed as a beam spot of a diameter of about 1 μm on the surface of the disk 9 via a polarizer 14 and a beam splitter 12 and by the use of a condenser lens 13. The magnetic film of the disk 9 is pre-magnetized in a perpendicular direction, and the direction of magnetization is inverted by application of the laser beam and the imagewise information is recorded on the disk as indicated by bits 18 in FIG. 3.

On the other hand, during the reproduction, a light beam of a predetermined intensity is emitted from the laser light source 10 and made into a linearly polarized light by a polarizer 7 and applied to bit rows formed on the disk 9. The reflected light from the disk 9 whose plane of polarization has been rotated by the magnetic Kerr effect in accordance with the recorded information is changed in direction by the beam splitter 12 and directed to a light-receiving element 16 through an analyzer 15, and the signal is detected and the recorded imagewise information is reproduced by a signal processing circuit 17.

If, in the above-described disk, the interval between the bit rows (track pitch) is 2 μm and the area from 100 mm to 200 mm of the diameter of the disk is the recording area, an amount of information of about 2G bit can be recorded and about 125 sheets of A4 size imagewise information can be contained at 16 pels. This recorded imagewise information can be randomaccessed by moving an optical system as shown in FIG. 2 relative to the disk in the radial direction of the disk. Also, said record can be simply erased by applying to the disk an intense magnetic field coincident with the direction of magnetization before the recording.

Figure 4A:
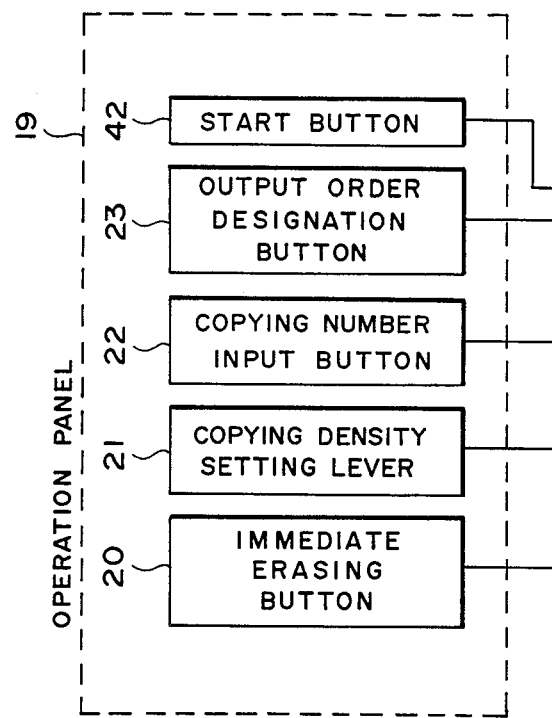
FIG. 4 composed of FIGS. 4A, 4B and 4C is a block diagram of a first embodiment of the information processing apparatus of the present invention.
Figure 4:
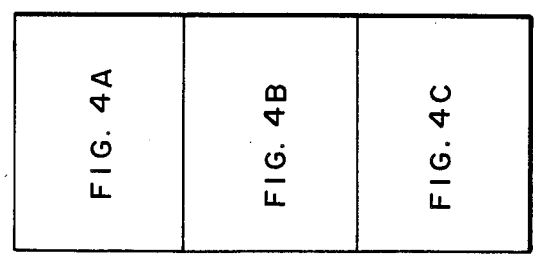
Figure 4B:
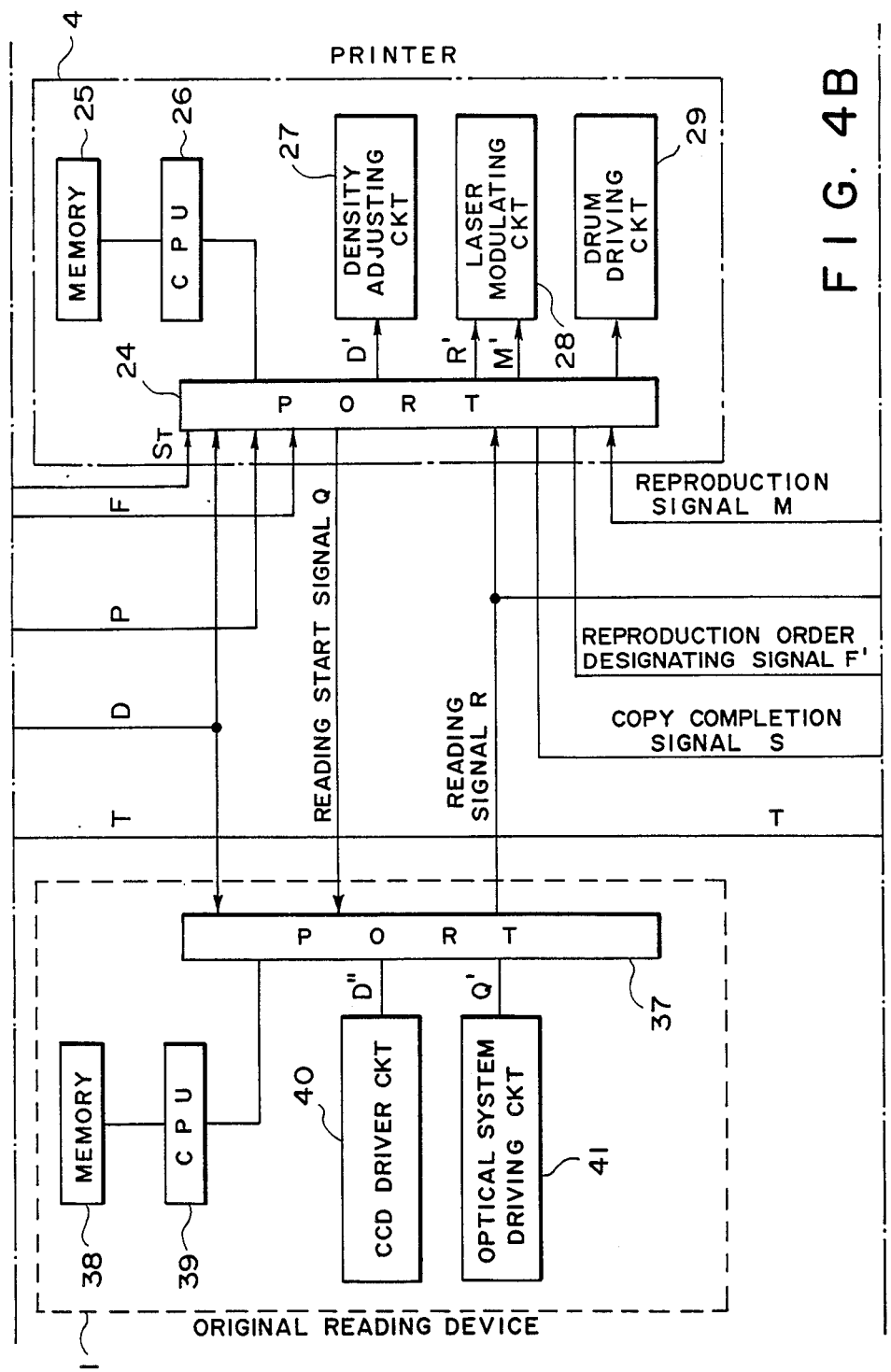
Figure 4C:
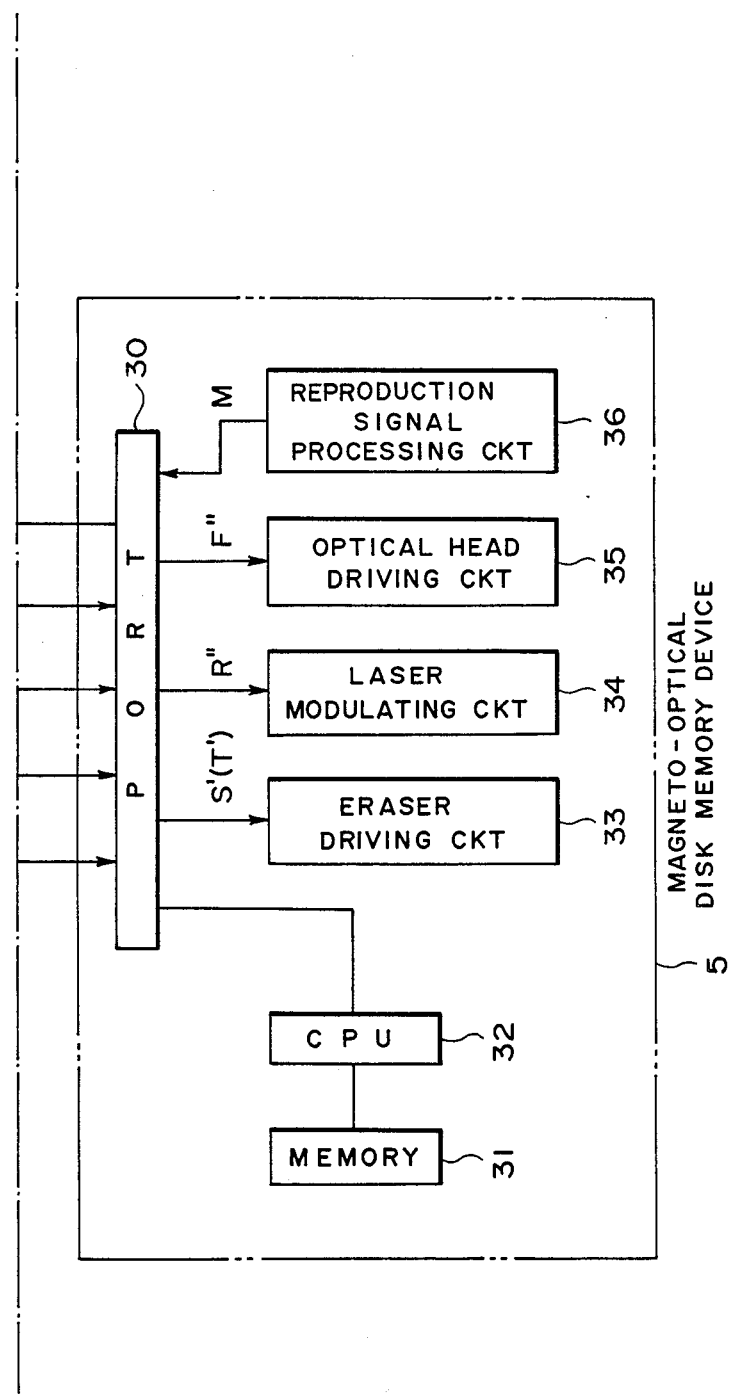
Figure 5:
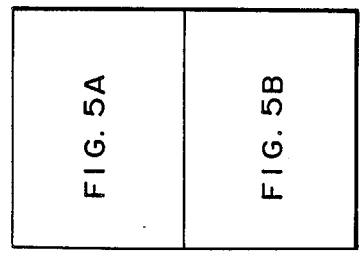
FIG. 5 composed of FIGS. 5A and 5B is a flow chart illustrating the information processing method in the first embodiment.
Figure 5B:
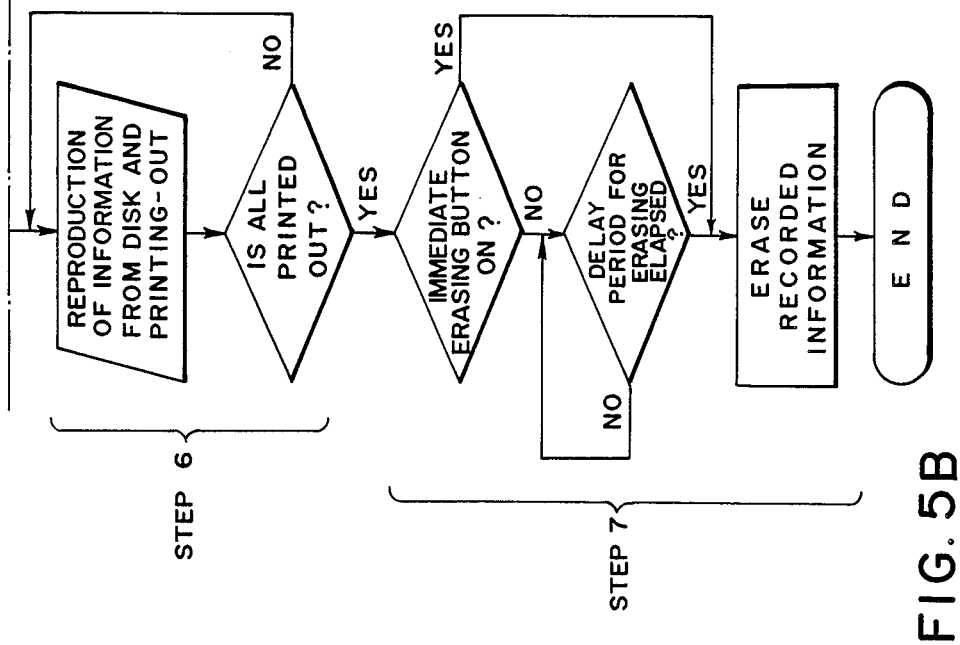
Figure 5A:
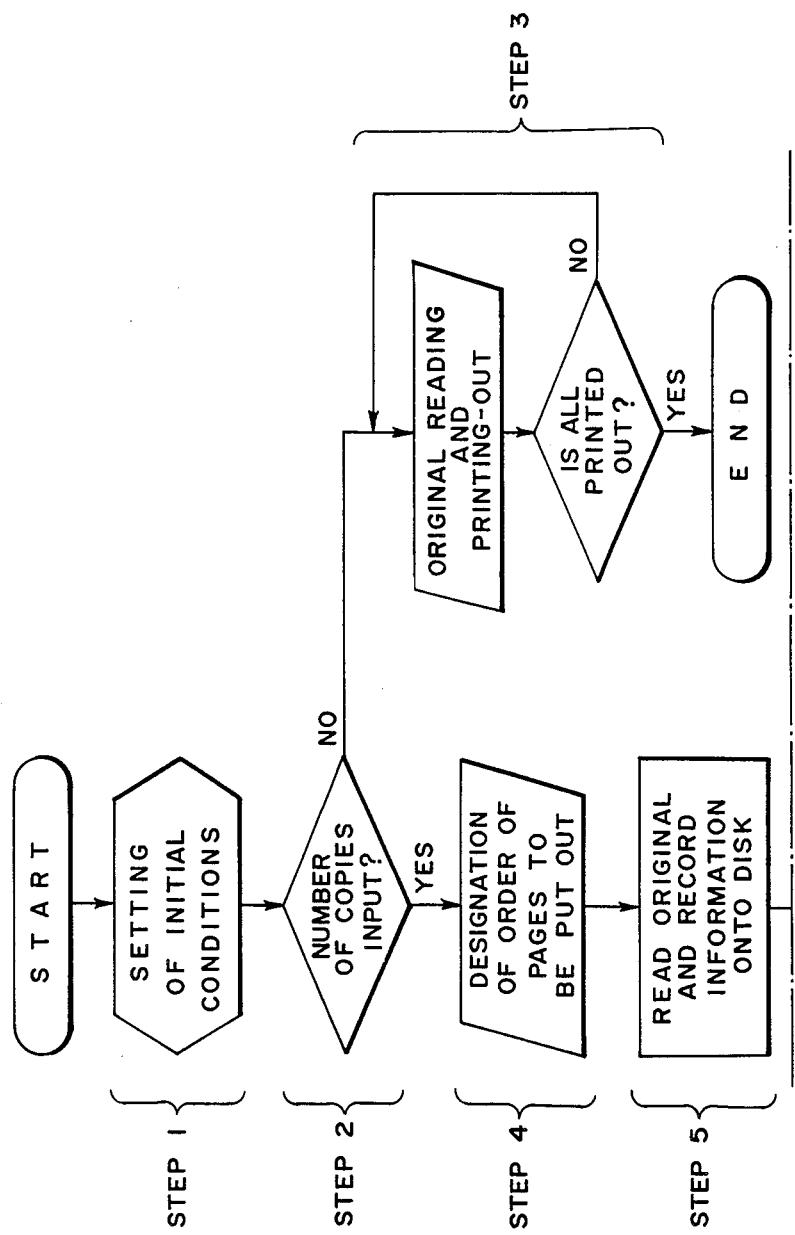

A block diagram of a first embodiment of the imagewise information processing apparatus having the construction shown in FIG. 1 is shown in FIG. 4, and an imagewise information processing method using such apparatus will now be described by reference to the flow chart of FIG. 5.

First, at step 1, a copying density setting lever 21 on an operation panel 19 is operated to set the initial conditions such as the copying density, etc. This copying density setting signal D is supplied to the original reading device 1 and the printer 4 and, for example, in the printer 4, this signal is input as a signal D' to a density adjusting circuit 27 through a port 24. Subsequently, at step 2, the number of copies is input by a copying number input button 22. In the present embodiment, this input also serves to judge the use of the memory and, when the number of copies is not input, the program shifts to step 3 and, upon depression of a start button 42, the original is read by the original reading device 1 in accordance with the reading start signal Q from the printer 4, and the reading signal R is directly received by the printer 4 and a copy is put out in real time.

When the number of copies is input at step 2, the program shifts to step 4 and the order of pages to be put out is designated by a designation button 23 (for example, the output should be effected in the order of inputs or every other page should be put out). Next, at step 5, the original is read and the disk is caused to store the information therein. At this step, the reading start signal Q is supplied from the printer 4 to the port 37 of the original reading device 1 in accordance with the start signal ST from the start button 42. A CCD driver circuit 40 and an optical system driving circuit 41 are driven while being controlled by CPU 39 and memory 38, and the original is read. This reading signal R is supplied to the port 30 of the magneto-optical disk memory device and input as a signal R" to a laser modulating circuit 34, and as previously described, the modulated laser beam is applied to the disk, whereby the imagewise information is stored therein.

When the memory input is completed, the imagewise information stored on the basis of the aforementioned conditions is reproduced by the magneto-optical disk memory device at step 6 and the reproduction signal is supplied to the printer 4, whereby the copy image is put out. A signal F is supplied as a reproduction order designating signal F' from the designation button 23 to a port 30 through a port 24 and is input as a signal F" to an optical head driving circuit to move an optical head, and the imagewise information is read out from the disk in the designated order. This imagewise information is supplied as a reproduction signal M from a reproduction signal processing circuit 36 to the port 24 of the printer 4 through the port 30 and input as a signal M' to a laser modulating circuit 28 to print out the copy image by a known electrophotographic process in operative association with a drum driving circuit 29. When the printing-out is all completed, a copy completion signal S is supplied from the printer 4 to the magneto-optical disk memory device. These processes of information reproduction to printing-out are controlled by the CPUs 32 and 26 of the magneto-optical disk memory device 5 and the printer 4, respectively, and memories 31 and 25.

Sugsequently, at step 7, the information stored on the disk by the magneto-optical disk memory device 5 is erased. When an intermediate erasing button on the operation panel 19 is in ON position, an erasing signal S'(T') is supplied to an eraser driving circuit 33 immediately after the copy completion signal S has been input to the port 30 by a signal T, thereby erasing the information recorded on the disk. When the intermediate erasing button is in OFF position, the erasing signal S'(T') is input to the eraser driving circuit 33 after the lapse of a predetermined time (e.g. 30 minutes) determined by the timer within CPU 32 after the copy completion signal S has been input, thereby erasing the recorded information on the disk. Within this erasing postponement time, the user can examine erroneous copies or confirm the number of copies and supplement the copies.

In the above-described embodiment, the timer within the CPU is used as time counting means, but alternatively an external timer connected to the CPU may be used. Also, this timer may be provided with erasing postponement setting means so that the aforementioned predetermined time can be set arbitrarily. As a further alternative, a timepiece may be connected to the CPU so that erasing may automatically take place at a predetermined time of the day (for example, at midnight of every day) instead of a predetermined time after the completion of the reproduction processing. Further, in the previously described embodiment, only when the immediate erasing button is in ON position, the recorded information is erased immediately after the termination of the outputting, whereas such an immediate erasing button need not always be provided but design may be made such that the recorded information is automatically erased immediately or in a predetermined time after the outputting of the image. In the aforedescribed disk memory device, the information is erased on the basis of the copy completion signal supplied from the printer, but alternatively, the magneto-optical disk memory device itself may effect the erasing upon completion of the outputting of the reproduction signal.

Figure 6A:
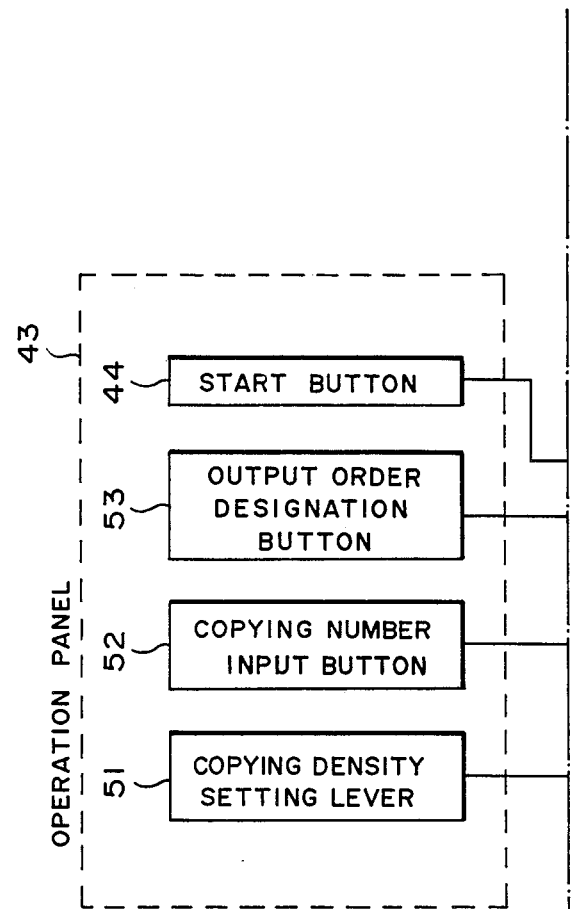
FIG. 6 composed of FIGS. 6A, 6B and 6C is a block diagram of a second embodiment of the information processing apparatus of the present invention.
Figure 6:
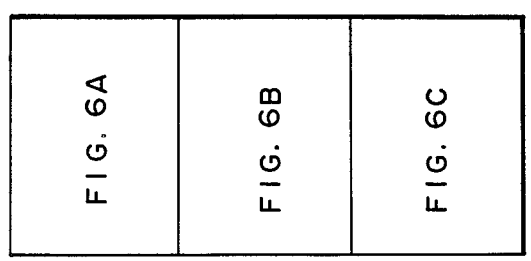
Figure 6B:
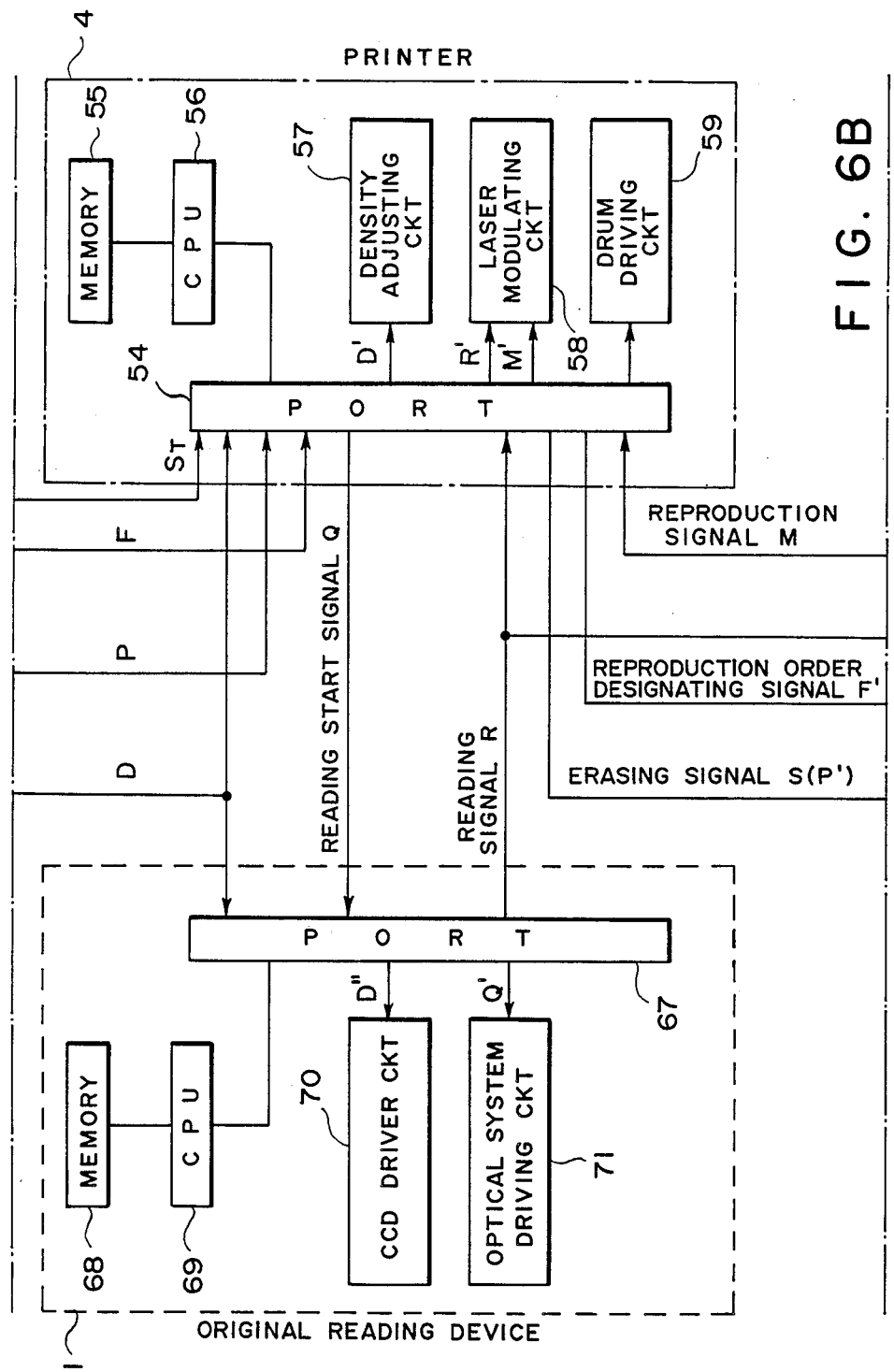
Figure 6C:
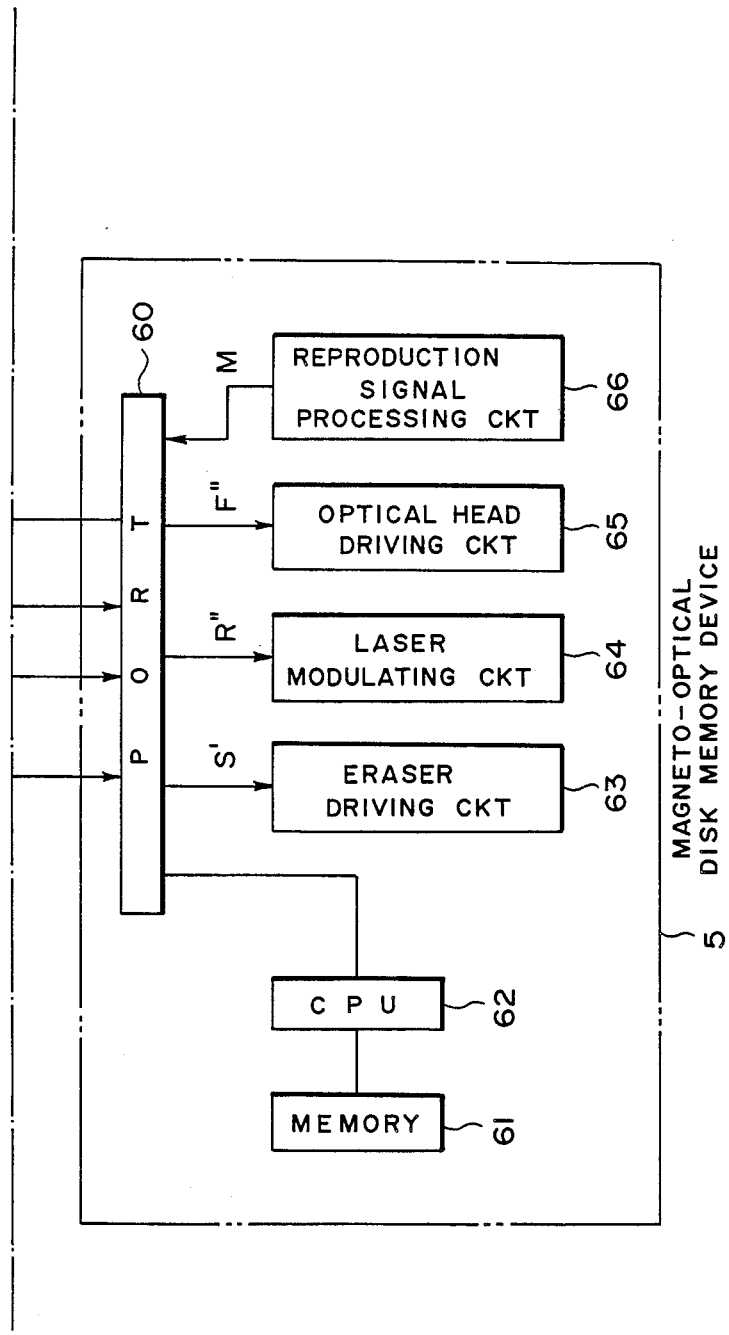
Figure 7:
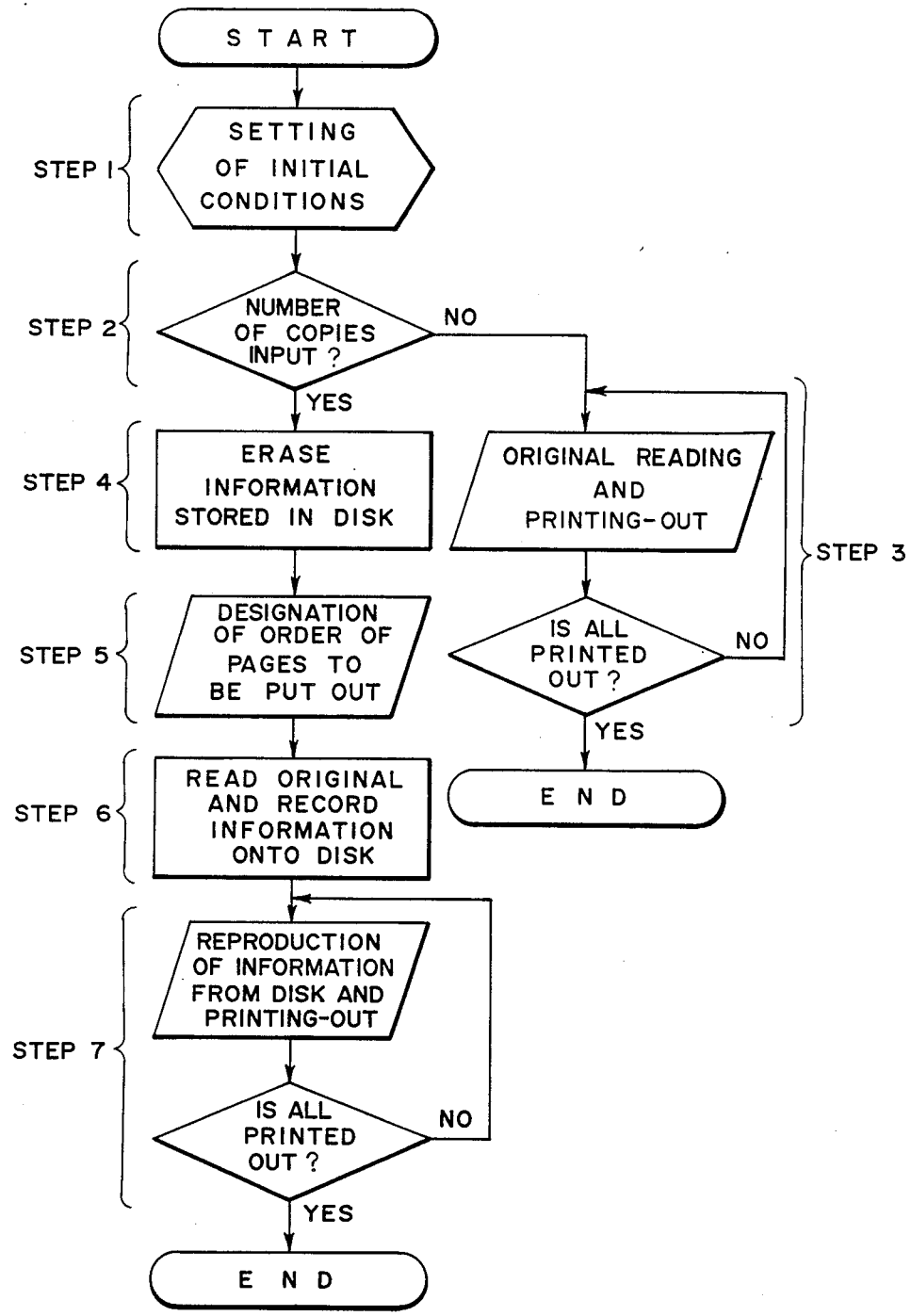
FIG. 7 is a flow chart illustrating the information processing method in the second embodiment.

A block diagram of a second embodiment of the imagewise information processing apparatus having the construction of FIG. 1 is shown in FIG. 6, and an imagewise information processing method using such apparatus will hereinafter be described by reference to the flow chart of FIG. 7.

First, at step 1, a copying density setting lever 51 on an operation panel 43 is operated to set the initial conditions such as the copying density, etc. This copying density setting signal D is supplied to the original reading device 1 and the printer 4 and, for example, in the printer 4, it is input as a signal D' to a density adjusting circuit 57 through a port 24. Next, at step 2, the number of copies is input by a copying number input button 52. In the present embodiment, this input also serves to judge the use of the memory and, when the number of copies is not input, the program shifts to step 3 and, upon depression of a start button 44, the original is read by the original reading device in accordance with the reading start signal Q from the printer 4, and the reading signal R is directly received by the printer 4 and copies are put out in real time.

When the number of copies is input at step 2, an erasing signal S(P') is supplied from the printer 4 to the port 60 of the magneto-optical disk memory device 5 on the basis of the copying number input signal P and operates an eraser driving circuit 63 as a signal S', thereby erasing the information already recorded during the previous use. That is, whenever new imagewise information is input and stored in the memory, the memory is refreshed and a maximum memory capacity (corresponding, for example, to 125 sheets of A4 size at 16 pels) is guaranteed for the user.

Subsequently, the program shifts to step 5 and the order of pages to be put out is designated by a designation button (for example, the output should be effected in the order of inputs or every other page should be put out). Next, at step 6, the original is read and the disk is caused to store the information therein. At this step, the reading start signal Q is supplied from the printer 4 to the port 67 of the original reading device 1 in accordance with the start signal ST from the start button 44. A CCD driver circuit 70 and an optical system driving circuit 71 are driven while being controlled by CPU 69 and memory 68, and the original is read. This reading signal R is supplied to the port 60 of the magneto-optical disk memory device 5 and input as a signal R'' to a laser modulating circuit 64, and as previously described, the modulated laser beam is applied to the disk, whereby the imagewise information is stored therein.

When the memory input is completed, the imagewise information stored on the basis of the aforementioned conditions is reproduced by the magneto-optical disk memory device at step 6 and the reproduction signal is supplied to the printer 4, whereby the copy image is put out. A signal F is supplied as a reproduction order designating signal F' from the designation button 53 to a port 60 through a port 54 and is input as a signal F'' to an optical head driving circuit to move an optical head, and the imagewise information is read out from the disk in the designated order. This imagewise information is supplied as a reproduction signal M from a reproduction signal processing circuit 66 to the port 54 of the printer 4 through the port 60 and input as a signal M' to a laser modulating circuit 58 to print out the copy image by a known electrophotographic process in operative association with a drum driving circuit 59, thus completing a series of sequences. At this time, a copy completion signal may be supplied from the printer 4 to the magneto-optical disk memory device 5 and at the next sequence, whether the information may be erased can be confirmed. That is, in the present embodiment, the information recorded on the disk is automatically erased immediately before the magneto-optical disk memory device is again used after the termination of the reproduction processing. Also, in the present embodiment, there has been shown an example in which the recorded information is erased on the basis of the copying number input button, but the gist of the present invention will not be spoiled even if the erasing is effected on the basis of any signal which can judge that the magneto-optical disk memory device is used before new imagewise information is input.

In the above-described embodiments, the operation panel has been shown as an independently provided remote control panel, but alternatively, it may be provided integrally with any one of the printer, the original reading device and the magneto-optical disk memory device.

The manner in which the information recorded on the magneto-optical disk memory device is erased will now be described by reference to FIGS. 8A, 8B and 8C. In FIG. 8A, when the direction of magnetic field in the marginal portion of the recording bit of the disk 9 is the direction of arrow A, an erasing head 72 comprising a bar-like magnet having its S pole adjacent to the disk and its N pole on the opposite side is positioned above the disk 9 to erase the recording bit. This erasing head 72 is retracted from the disk 9 during recording/reproduction, and is rotated about a rotary shaft 74 by the drive of a motor 73 on the basis of the sorter content erasing instruction during the aforementioned sequence and stopped at a position whereat the radial direction of the disk is substantially coincident with the lengthwise direction of the erasing head. An example of the then control and the timing chart thereof are shown in FIGS. 8B and 8C, respectively.

Figure 8B:
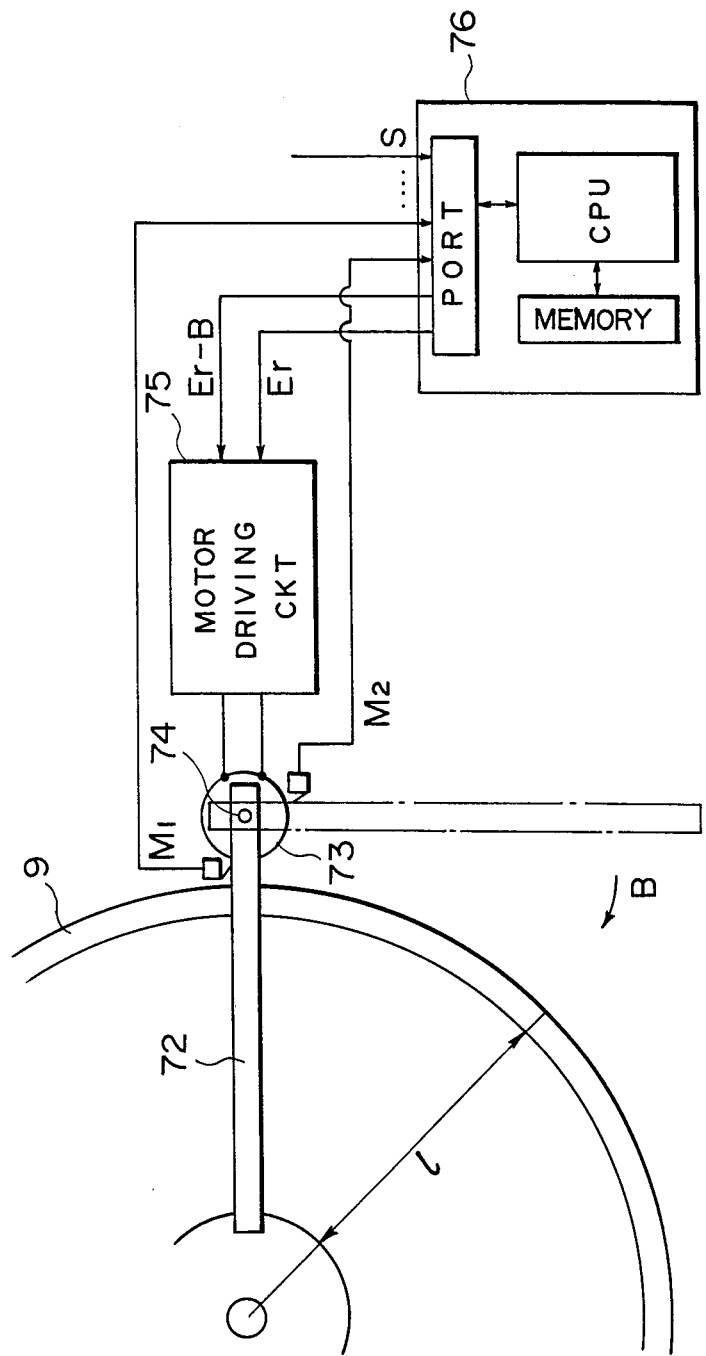
FIGS. 8A, 8B and 8C are schematic views showing an example of the imagewise information erasing means used in the embodiments of FIGS. 4 and 6.
Figure 8A:
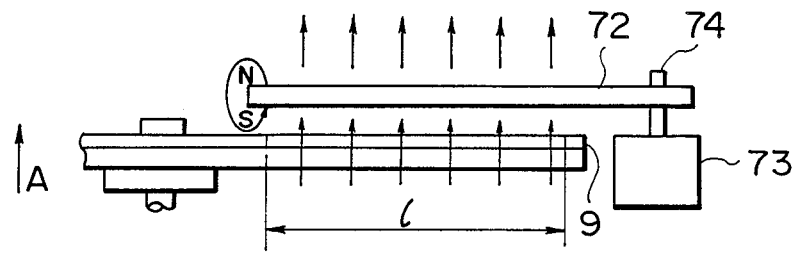
Figure 8C:
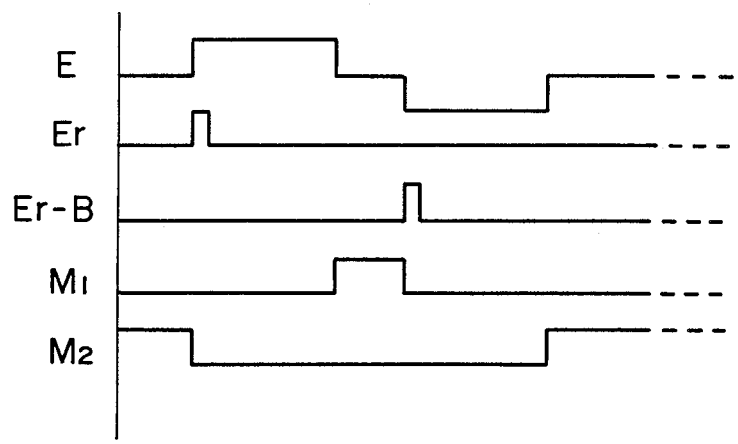

In FIGS. 8B and 8C, when a memory use designating signal S is input to a control circuit 76 for controlling the sequence, a motor revolution signal Er is produced at a predetermined timing and on the basis thereof, a driving voltage E is applied from a motor driving circuit 75 to the reversible motor 73, thereby revolving the motor 73. At this time, the erasing head 72 is rotated in the direction of arrow B with the rotary shaft 74 of the motor 73, and a microswitch M1 is closed at a position whereat the radial direction of the disk is substantially coincident with the lengthwise direction of the erasing head 72, thus stopping the revolution of the motor by the signal produced thereby. The disk 9 may be in rotation at this time or may start to rotate after the erasing head is stopped. The direction of magnetization of the magnetic film of the disk is regularized in the direction of the arrow as shown in FIG. 8A by the disk 9 making at least one full rotation after the erasing head is stopped, thereby erasing the information recorded on the disk 9. Thereafter, a signal Er-B for revolving the motor in the reverse direction is produced from the control circuit 76, and the driving voltage E is applied from the motor driving circuit 75 to the reversible motor 73 and thus, the motor is revolved in the direction opposite to the direction of arrow B to cause the erasing head to be retracted from the disk 9. This revolution is stopped by a microswitch M2 which determines the home position of the erasing head being closed. The recorded information on the disk is erased by the above-described process. The erasing head has a length sufficient to cover at least the recording area width l in the radial direction of the disk and, if the bit width in the radial direction of the disk is 1 $\mu$m, the intensity of the magnetic field on the magnetic film produced by the erasing head is 1 kOe or more because the direction of magnetization of the bit is inverted.

Figure 9:
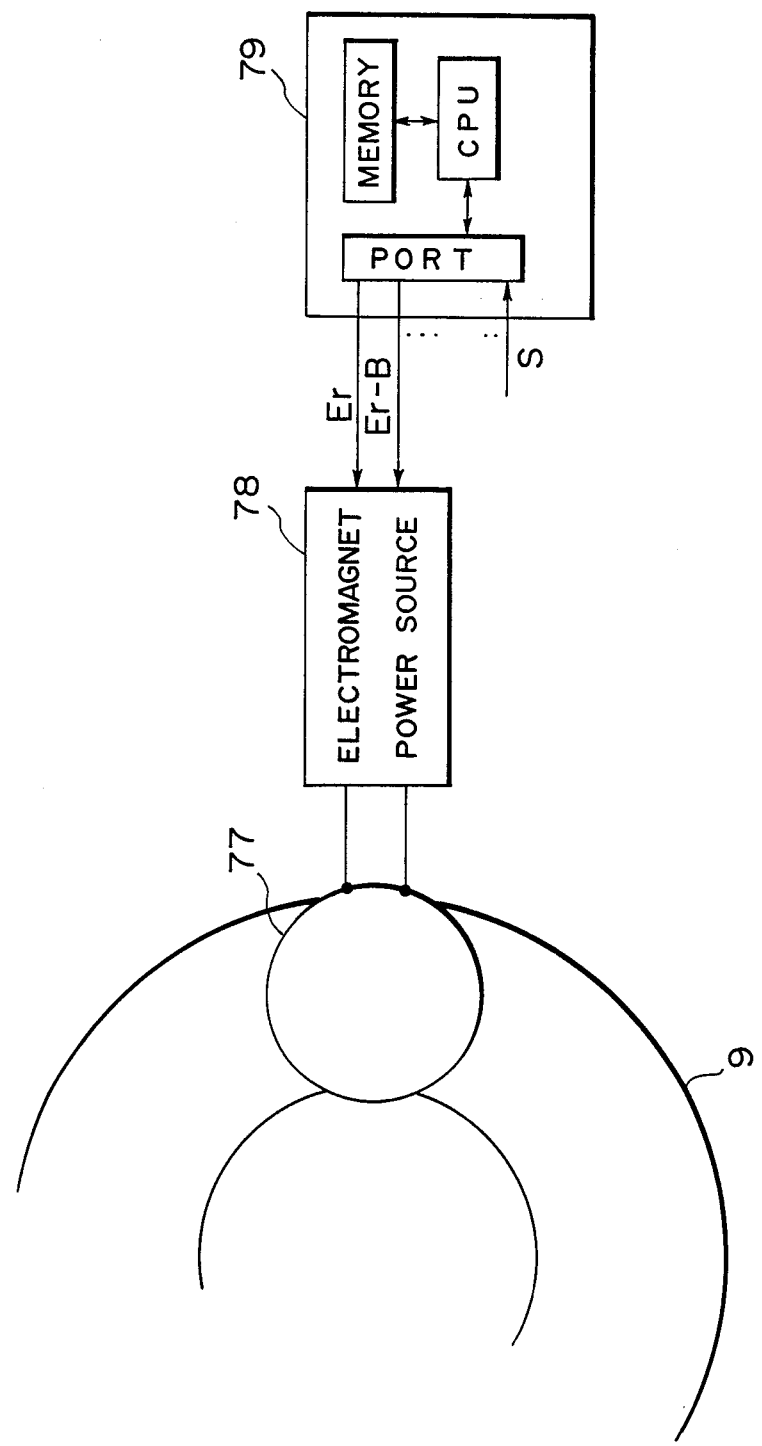
FIG. 9 is a schematic view showing another example of the imagewise information erasing means.

Also, if an auxiliary magnetic pole is provided on the opposite side of this magnet with respect to the surface of the disk, the magnetic flux can be more effectively concentrated in the direction of the arrow. Although erasing means comprising a permanent magnet, a motor, etc. has been shown as an example, the use of various other erasing heads in which, as shown in FIG. 9, an electromagnet 77 is fixed above (or below) the disk and power is supplied from an electromagnet power source 78 to the electromagnet by the signal Er from a control circuit 79 to produce a magnetic field and erase the recorded information and the power supply is stopped by a signal Er-B may result in a similar effect.

The present invention is not limited to the above-described embodiments, but various modifications may be made therein. For example, the imagewise information processing method shown herein is only an example and the page order designation, the order of copying number inputs, etc. can of course be freely changed.

The information processing apparatus according to the present invention is not restricted to the construction comprising an original reading device, a magneto-optical disk memory device and a printer as in the above-described embodiments, but may be of a construction in which some of them are integral with each other. Further, the imagewise information is not limited to one obtained from the original reading device, but may be supplied from a facsimile apparatus, a computer output device or a display device. Also, IC memory or other memory means may be employed instead of the magneto-optical disk memory device.

What we claim is:

1. An imagewise information processing apparatus comprising:

input means for inputting imagewise information;

writing-in means for writing in information signal from said input means into an erasable optical recording medium;

reading-out means for reading out the information signal written in into the optical recording medium;

image forming means for reproducing an image from the information signal from said reading-out means;

erasing means for erasing the information signal written in into the optical recording medium, said erasing means being controlled independently of said writing-in means and said reading-out means; and control means for driving said erasing means during a period from the completion of a reproduction by said image forming means to the commencement of a next writing-in by said writing-in means to cause said erasing means to automatically erase the information signal written in into the optical recording medium.

2. An imagewise information processing apparatus according to claim 1, wherein said control means causes said erasing means to commence the erasing on the basis of a reproduction completion signal supplied from said image forming means.

3. An imagewise information processing apparatus according to claim 1, wherein said control means includes time counting means and said control means causes said erasing means to commence the erasing after the lapse of a predetermined time from the completion of the reproduction by said image forming means.

4. An imagewise information processing apparatus according to claim 3, wherein said control means includes means for adjusting said time to a desired time.

5. An imagewise information processing apparatus according to claim 1, wherein said control means includes a timepiece and causes said erasing means to commence the erasing at a predetermined time.

6. An imagewise information processing apparatus according to claim 1, wherein said control means includes means for causing said erasing means to commence the erasing on the basis of a command from outside.

7. An imagewise information processing apparatus according to claim 1, wherein the optical recording medium is a magneto-optical disk.

8. An imagewise information processing apparatus accorcing to claim 1, wherein said image forming means includes means for directly reproducing an image from the imagewise information input from said input means.

9. An imagewise information processing apparatus according to claim 1, wherein said input means is an original reading device.

10. An imagewise information processing apparatus according to claim 7, wherein said erasing means comprises a magnet for regularizing the direction of magnetization of said magneto-optical disk.

11. An imagewise information processing apparatus according to claim 1, wherein said image forming means is a laser beam printer.

* * * * *

UNITED STATES PATENT AND TRADEMARK OFFICE
CERTIFICATE OF CORRECTION

PATENT NO. : 4,597,018

DATED : June 24, 1986

INVENTOR(S) : HIRAKU SONOBE, ET AL.

It is certified that error appears in the above-identified patent and that said Letters Patent is hereby corrected as shown below:

Column 1, line 26, add a comma after "and".

Column 3, line 36, change "randomaccessed" to --random-accessed--

Column 4, line 38, change "Sugsequently" to --Subsequently--.

Column 7, line 12, change "1" to --1-- (script).

Column 7, line 36, after "can" and "course" add commas.

Column 7, line 54, change "in information" to --an information--.

Signed and Sealed this

Twenty-seventh Day of January, 1987

Attest:

DONALD J. QUIGG

Attesting Officer     Commissioner of Patents and Trademarks